United States Patent
Kinoshita et al.

(10) Patent No.: US 6,770,373 B1
(45) Date of Patent: Aug. 3, 2004

(54) WATER-BASED METAL SURFACE TREATMENT COMPOSITION FOR FORMING LUBRICATING FILM WITH EXCELLENT MARRING RESISTANCE

(75) Inventors: Yasuhiro Kinoshita, Tokyo (JP); Ryoji Morita, Tokyo (JP)

(73) Assignee: Henkel Corporation, Gulph Mills, PA (US)

( * ) Notice: Subject to any disclaimer, the term of this patent is extended or adjusted under 35 U.S.C. 154(b) by 0 days.

(21) Appl. No.: 09/869,133

(22) PCT Filed: Dec. 22, 1999

(86) PCT No.: PCT/JP99/07210
§ 371 (c)(1),
(2), (4) Date: Nov. 26, 2001

(87) PCT Pub. No.: WO00/39224
PCT Pub. Date: Jul. 6, 2000

(30) Foreign Application Priority Data

Dec. 25, 1998 (JP) .......................................... 10/369004

(51) Int. Cl.⁷ .......................... B32B 27/40; B32B 31/26; B32B 15/08; C08L 75/00; C08K 5/01
(52) U.S. Cl. .................... 428/423.1; 428/340; 428/413; 428/418; 427/385.5; 524/589; 524/590; 524/591
(58) Field of Search .............................. 428/423.1, 413, 428/418, 340; 427/385.5; 524/589, 590, 591

(56) References Cited

U.S. PATENT DOCUMENTS 6,479,152 B1 * 11/2002 Miyauchi et al. ........... 428/418

FOREIGN PATENT DOCUMENTS

| EP | 687715 | 10/2001 | | |
|---|---|---|---|---|
| JP | 60103185 | 6/1985 | | |
| JP | 61231117 | 10/1986 | | |
| JP | 61279687 | 12/1986 | | |
| JP | 62289274 | 12/1987 | | |
| JP | 692567 | 4/1994 | | |
| JP | 6104799 | 4/1994 | | |
| JP | 6145559 | 5/1994 | | |
| JP | 06173037 A | * | 6/1994 | ........... C23C/28/00 |
| JP | 6233781 | 8/1994 | | |
| JP | 6292859 | 10/1994 | | |
| JP | 7242833 | 9/1995 | | |
| JP | 08258214 A | * | 10/1996 | ........... B32B/15/08 |
| JP | 08290109 A | * | 11/1996 | ............ B05D/7/14 |
| JP | 08290110 A | * | 11/1996 | ............ B05D/7/14 |
| JP | 10110093 | 4/1998 | | |

OTHER PUBLICATIONS

Machine Translation of JP 06–145559, provided by JPO website.*

* cited by examiner

Primary Examiner—Philip Tucker
Assistant Examiner—Michael Feely
(74) Attorney, Agent, or Firm—Stephen D. Harper; Mary K. Cameron

(57) ABSTRACT

A water-based metal surface treatment composition for forming a lubricating film with excellent marring resistance, characterized in that it comprises (a) a water-compatible urethane resin which contains bisphenol skeletons and carboxyl groups in the resin backbone and has an average molecular weight of 3,000 or higher and which has been synthesized through reaction of an isocyanate in which the content of nitrogen atoms participating in the isocyanate reaction is 2 to 13 wt. % and the ratio of nitrogen atoms participating in urea bond formation to the nitrogen atoms participating in the isocyanate reaction is 10/100 to 90/100, (b) a hardener, (c) silica, and (d) a polyolefin wax, and that the sum of the ingredients (a) and (b) is 50 to 95 wt. % based on the whole composition (e) on a solid basis, the amount of functional groups contained in the ingredient (b) is 0.10 to 1.00 equivalent to the carboxyl groups contained in the backbone of the ingredient (a), the amount of the ingredient (c) is 3 to 40 wt. % based on the composition (e) on a solid basis, and the amount of the ingredient (d) is 2 to 30 wt. % based on the composition (e) on a solid basis.

21 Claims, No Drawings

WATER-BASED METAL SURFACE TREATMENT COMPOSITION FOR FORMING LUBRICATING FILM WITH EXCELLENT MARRING RESISTANCE

This application claims priority from Japanese Application No. 10-369004, filed Dec. 25, 1998, and International Application No. PCT/JP99/07210, filed Dec. 22, 1999.

FIELD OF TECHNOLOGY

The present invention relates to a water-based metal surface treatment composition for forming a lubricating film with excellent marring resistance.

BACKGROUND TECHNOLOGY

Manufacturers of home electrical appliances, automobiles, building materials, and so forth have often made use of cold-rolled or galvanized sheet steel in the past, and these sheets are most often painted after undergoing press molding or other such forming. Some materials, however, do not lend themselves well to forming, so the desired formability is achieved by coating them with a lubricating oil, typically a press oil, in the course of the forming. When this forming is to be followed by painting, the applied lubricant must be one that can be removed in a degreasing process.

Accordingly, in an effort to reduce the number of steps entailed, lower the cost, and improve the working environment, manufacturers have been offering sheet steel that comes already coated with a wax-based lubricant, so that a press oil need not be used. A wax-based lubricant, however, must be removed in a subsequent degreasing process, and while this is indeed an improvement over using a press oil in terms of the press environment, there is still room for improvement. Functional surface treated sheet steel having a better lubricated surface has therefore been developed. This sheet steel is coated with a thin film of a composition whose main component is an organic resin with good lubricity, and can therefore be formed without having to be coated with a press oil or other lubricant, and furthermore this surface treated sheet steel does not need to undergo any subsequent degreasing or undercoating treatment.

Prior art pertaining to this functional surface treated sheet steel has been disclosed in (1) Japanese Laid-Open Patent Applications S61-231177, S61-279687, and S62-33781, (2) Japanese Laid-Open Patent Application S62-289274, (3) Japanese Laid-Open Patent Application S60-103185, (4) Japanese Patent Publication H6-92567, (5) Japanese Patent Publication H6-104799, and (6) Japanese Laid-Open Patent Application H6-292859, which will be summarized below.

The art disclosed in the publications of (1) is related to a surface treated steel sheet, characterized in that a film, comprising a silane coupling agent and/or a titanium coupling agent, a chromate, silica sol, a microparticle coloring pigment, and a solid lubricant contained in an emulsion polymer composed of a monomer expressed by the general formula $CH_2=CR_1-COOR_2$, an $\alpha,\beta$-unsaturated carboxylic acid monomer, and a monomer that is copolymerizable with these, is formed on the steel sheet surface. A film obtained in this manner is effective for relatively light forming, such as bending and offsetting, but during intense working such as squeezing and drawing, typified by press forming, a sliding surface temperature can exceed 100° C., at which point the resin film layer is prone to separation, and resin dust clings to the surfaces of the mold or press formed article, which adversely affects the appearance of the formed article.

The publication disclosed in (2) is characterized in that a film layer whose main component is a composite or mixture of a urethane-based resin and silicon dioxide is provided over a galvanized steel sheet. Here, the term "urethane resin" refers to a mixture of a urethane resin and another resin (such as epoxy, acrylic, or phenol). The film obtained in this manner is effective in forming that involves low-speed sliding (10 mm/sec or less), but film separation occurs in press forming and other high-speed sliding forming (approximately 500 mm/sec), so the targeted high lubricity cannot be achieved.

The publication disclosed in (3) relates to a two-layer chromate treated steel sheet, characterized in that a special chromate layer is provided over a steel sheet plated with zinc or a zinc compound, and over this is formed a composite chromate film composed of an amino-terminated urethane modified epoxy resin, a silicone resin, molybdenum disulfide, a polyolefin wax, a chromate-based rustproof pigment, and composite aluminum phosphate. Because this film makes use of a self-crosslinking type of amino-terminated urethane modified epoxy resin, relatively stable performance can be obtained even without a crosslinking agent, but the targeted level of performance cannot be achieved.

The publication disclosed in (4) is characterized in that an electroconductive substance, a chromium compound, and a lubricating substance are compounded with a resin composition composed of a resin selected from among epoxy resins, polyester resins, and acrylic resins, and a polyisocyanate or an amino resin that serves as a hardener component. With a film obtained in this manner, the targeted marring resistance during high-speed sliding cannot be achieved because the wear resistance of the film itself is inadequate.

The publication disclosed in (5) is characterized in that a film comprising a polyethylene wax with an average molecular weight of 2000 to 8000 contained in a polyester resin and a crosslinking agent is formed over the surface of a steel sheet. With a film obtained in this manner, the targeted level of performance (corrosion resistance and paint adhesion) cannot be achieved because the hydrolysis resistance of the film itself is inadequate.

The publication disclosed in (6) is characterized in that a film containing a urethane resin having active hydrogen in its molecules, an epoxy resin of the type that crosslinks at normal temperature, spherical polyethylene wax, and linear colloidal silica is formed over the surface of a steel sheet. There are no restrictions on the urethane resin used for this film, and there are numerous cases when the performance of the resulting film does not meet the targeted level.

Therefore, at present there has yet to be obtained a water-based paint composition that has good marring resistance during intense working, as well as excellent corrosion resistance and paint adhesion.

DISCLOSURE OF THE INVENTION

The present invention was conceived in an effort to solve the above-mentioned problems encountered with prior art, and it is an object thereof to provide a water-based lubricating paint composition for a highly functional surface treated sheet that has good marring resistance during intense working, as well as excellent corrosion resistance and paint adhesion.

As a result of diligent research aimed at solving the above-mentioned problems encountered with prior art, the inventors perfected the present invention upon discovering that it is favorable to use a water-based metal surface treatment composition containing a water-based urethane resin with a specific structure, a hardener, silica, and a polyolefin wax.

Specifically, the present invention provides a water-based metal surface treatment composition for forming a lubricating film with excellent marring resistance, characterized by containing (a) a water-based urethane wax, in which average molecular weight of the water-based urethane is at least 3000 and the resin skeleton includes a bisphenol skeleton and a carboxyl group, the content of nitrogen participating in an isocyanate reaction during the synthesis of said resin is between 2 and 13 wt %, and the ratio of the nitrogen in urea bonds to the nitrogen participating in the isocyanate reaction, which is the proportion of nitrogen atoms pertaining to urea bonds out of the nitrogen atoms participating in the isocyanate reaction during the synthesis of said resin, is between 10/100 and 90/100; (b) a hardener; (c) silica; and (d) a polyolefin wax, wherein the combined amount of components (a) and (b), as solids with respect to the total solid weight (e), is 50 to 95 wt %, the equivalent ratio of functional groups in component (b) with respect to the equivalent of carboxyl groups contained in the skeleton of component (a) is 0.10 to 1.00, the solid weight of component (c) with respect to (e) is 3 to 40 wt %, and the solid weight of component (d) with respect to (e) is 2 to 30 wt %.

The nitrogen content of the water-based urethane resin of the present invention is preferably 5 to 10 wt %. It is also preferable in the surface treatment composition of the present invention if said hardener includes at least one type of functional group selected from among epoxy groups and isocyanate groups. It is also preferable in the surface treatment composition of the present invention if the amount of carboxyl groups in said water-based urethane resin is 10 to 50 calculated as the acid value for the solids of said resin. It is also preferable in the surface treatment composition of the present invention if the saponification value of said polyolefin wax is 30 or less, or zero, and the structure is branched. It is also preferable in the surface treatment composition of the present invention if said polyolefin wax has an average particle size of 0.1 to 7.0 μm.

The present invention will now be described in detail.

The first characteristic feature of the present invention is that a type of resin that is suitable as a base resin is compounded in a specific weight ratio. This resin is a component that must strike a good balance between adhesion, elongation, shear strength, corrosion resistance, wear resistance, and chemical resistance. The resin of the present invention can be used favorably to satisfy all of these performance requirements. The inventors have previously succeeded at obtaining good corrosion resistance and working strength by compounding a urethane resin with an epoxy resin and by compounding a special wax, but further research has revealed that particularly outstanding performance can be attained by specifying the structure of the urethane resin.

To achieve good workability and high corrosion resistance, it is important that a good balance be struck between the strength and elongation of a coating film. It was discovered that when a urethane resin with an average molecular weight of at least 3000 is used with a hardener, the basic properties are easier to control than with a film produced by the crosslinking of resins with a low molecular weight, and that uniform properties are easy to obtain even with a thin film with a dry film weight of 0.3 to 5.0 g/m². Low molecular weight urethane resin as used here refers to those including various types of isocyanate-based hardener.

Examples of the bisphenol skeleton that serves as the skeleton of the water-based urethane resin used in the surface treatment composition of the present invention include methylene bisphenol, ethylidene bisphenol, butylidene bisphenol, isopropylidene bisphenol, alkylene oxide (such as propylene oxide or butylene oxide) adducts of these, and epoxy modified polyols obtained by reacting an organic amine with an epoxy resin having a bisphenol skeleton. Incorporating this skeleton into a resin greatly improves corrosion resistance, adhesion, and so on. There are no particular restrictions on the number of added moles of alkylene oxide, but zero or no more than 10 is preferred. If 10 is exceeded, the molecular weight of the glycol will be too high, so the resulting resin film will be strongly hydrophilic and corrosion resistance and paint adhesion will suffer. Examples of organic amines include dimethylamine, diethylamine, dipropylamine, diisopropylamine, dibutylamine, diamylamine, dimethanolamine, diethanolamine, and methylethanolamine.

In addition to a polyol having a bisphenol skeleton, a polyester polyol compound or a polyether polyol may be used concurrently as a skeleton in the water-based urethane resin used in the present invention. Examples of polyester polyol compounds include polyester compounds having terminal hydroxyl groups and obtained through a reaction between ethylene glycol, diethylene glycol, triethylene glycol, 1,2-propylene glycol, 1,3-propylene glycol, 1,2-butylene glycol, 1,3-butylene glycol, 1,4-butylene glycol, hexamethylene glycol, trimethylolpropane, glycerol, or another such low molecular weight polyol with succinic acid, glutamic acid, adipic acid, sebacic acid, phthalic acid, isophthalic acid, terephthalic acid, tetrahydrophthalic acid, hexahydrophthalic acid, endomethylenetetrahydrophthalic acid, or another such polybasic acid. Examples of polyether compounds include ethylene oxide and/or propylene oxide high adducts of ethylene glycol, diethylene glycol, triethylene glycol, 1,2-propylene glycol, 1,3-propylene glycol, 1,2-butylene glycol, 1,3-butylene glycol, 1,4-butylene glycol, hexamethylene glycol, hydrogenated bisphenol A, trimethylolpropane, glycerol, and other such low molecular weight polyols, polyethylene glycol, polypropylene glycol, polyethylene/polypropylene glycol, and other such polyether polyols, polycaprolactone polyols, polyolefin polyols, and polybutadiene polyols.

Another characteristic feature is that the water-based urethane resin used in the present invention contains carboxyl groups in its skeleton. Another urethane resin that does not contain hydrophilic groups such as carboxyl groups cannot be made water-based because it will not be sufficiently hydrophilic. Introducing a sulfonate into a side chain is a known method for making a compound water-based without introducing carboxyl groups, but the water resistance of the resulting film is decreased because the sulfonate is too highly hydrophilic. Another known method is to use an emulsifier to forcibly render the compound water-based, but the water resistance of the resulting film is again decreased because the activators that are used are generally strongly hydrophilic. Accordingly, the preferred method is to introduce a carboxyl group into the resin skeleton and neutralize this with ammonia, triethylamine, or another alkali to effect self-emulsion. The suitable amount of carboxyl groups is 10 to 50 calculated as the acid value for the urethane resin solids. If this acid value is less than 10, adhesion will be inadequate and workability and corrosion resistance will be inferior. On the other hand, if the acid value is over 50, water resistance and alkali resistance will be inferior, so corrosion resistance will decrease. There are no particular restrictions on the method for introducing the carboxyl groups into the water-based urethane resin, but the most common way is to use a dimethylolalkanoic acid (such as 2,2-dimethylolpropionic acid, 2,2-dimethylolbutyric acid, or 2,2-dimethylolvaleric acid).

The water-based urethane resin used in the present invention is characterized in that the content of nitrogen participating in an isocyanate reaction during the synthesis of said resin is between 2 and 13 wt %. A preferable range is 5 to 10 wt %. If the nitrogen content is less than 2 wt %, there will be a decrease in the concentration in the water-based urethane resin of bonds that participate in an isocyanate reaction, so the excellent wear resistance that is characteristic of a urethane resin will be compromised. On the other hand, if the nitrogen content is over 13 wt %, the concentration in the water-based urethane resin of bonds that participate in an isocyanate reaction will be too high, the resulting film will be brittle and unable to accommodate the elongation resulting from the plastic deformation of the material, and the film, will be damaged, resulting in a decrease in corrosion resistance and paint adhesion.

Another major characteristic feature of the water-based urethane resin used in the present invention is that the ratio of the nitrogen in urea bonds to the nitrogen participating in the isocyanate reaction, which is the proportion of nitrogen atoms pertaining to urea bonds out of the nitrogen atoms participating in the isocyanate reaction during the synthesis of said resin, is between 10/100 and 90/100. A preferable range is 40/100 to 80/100. If this ratio is less than 10/100, tensile strength will be inadequate during high-speed sliding, that is, at high temperatures, so this will result in film separation and a decrease in marring resistance. On the other hand, if this ratio is greater than 90/100, the film will be too hard and unable to accommodate the elongation resulting from the plastic deformation of the material, and the film will again be damaged, resulting in a decrease in corrosion resistance and paint adhesion. There are no particular restrictions on the method for introducing the urea bonds into the resin skeleton, but known methods include reacting isocyanate groups with amino groups during the synthesis of a urethane prepolymer, and reacting water with a urethane prepolymer having terminal isocyanate groups. Examples of compounds having amino groups that can be used here include ethylenediamine, propylenediamine, hexamethylenediamine, tolylenediamine, xylylenediamine, diaminodiphenylmethane, diaminocyclohexylmethane, pirerazine, 2-methylpirerazine, isophoronediamine, succinic acid dihydrazide, adipic acid dihydrazide, and phthalic acid dihydrazide. As long as the ratio of the nitrogen in urea bonds to the nitrogen participating in the isocyanate reaction ends up being between 10/100 and 90/100, the water-based urethane resin component used in the present invention may be two or more types of resin raw material having the specified molecular weight and a bisphenol skeleton and carboxyl groups in the resin skeleton.

If a hardener is not used together with the water-based urethane resin, crosslinking will be inadequate and corrosion resistance and solvent resistance will be inferior, which is why a hardener is used in the present invention. This hardener can be an epoxy compound, oxazoline compound, aziridine compound, isocyanate compound, or the like. To obtain superior corrosion resistance and solvent resistance, though, it is best to use an aqueous dispersion type or water-soluble epoxy resin or isocyanate compound as the hardener. Other hardeners often have an acrylic, ester, or other component as the skeleton, but this is undesirable because the resulting film properties are affected by the above components, so there may be a decrease in corrosion resistance or paint adhesion. For example, if an epoxy resin is used as the hardener, a crosslinking reaction will readily occur because of the high reactivity of the terminal epoxy groups. If an isocyanate compound is used, the crosslinking density in the molecules will be raised by the reaction of the terminal isocyanate groups, and it is believed that as a result the tensile strength, solvent resistance, heat resistance, and so forth are improved. Out of all these hardeners, an epoxy resin having a bisphenol skeleton is particularly favorable.

The hardener is preferably used in an amount such that the proportion of functional groups in the hardener with respect to the carboxyl groups contained in the skeleton of the water-based urethane resin is 0.10 to 1.00. A range of 0.30 to 1.00 is even better. The effect of adding the hardener will be minimal if this proportion is less than 0.10, but if 1.00 is exceeded the characteristics of the resin of the present invention cannot be fully realized, and furthermore, some of the crosslinking agent will remain unreacted with the water-based urethane resin and have a plasticizing effect, so the corrosion resistance and solvent resistance will suffer.

The weight percentage of hardener solids with respect to the total solid weight is preferably 30% or less. The inherent performance of the water-based urethane resin cannot be extracted and performance such as corrosion resistance and paint adhesion decreases if the added amount is over 30%. During intense working such as squeezing and drawing, typified by press forming, a sliding surface temperature can exceed 100° C., so it is preferable for the Tg of the crosslinked film to be between 40 and 150° C. If the Tg of the crosslinked film is lower than 40° C., tensile strength will be inadequate during high-speed sliding, that is, at high temperatures, so this will result in film separation and a decrease in marring resistance. On the other hand, if the Tg of the crosslinked film is over 150° C., the film will be too hard and unable to accommodate the elongation resulting from the plastic deformation of the material, and the film will again be damaged, resulting in a decrease in corrosion resistance and paint adhesion.

It is preferable in the water-based paint composition of the present invention if the combined weight percentage of components (a) and (b), as solids with respect to the total solid weight (e), is 50 to 95 wt %. A range of 55 to 75% is even better. The binder effect will be inadequate if the proportion is less than 50%, so the desired corrosion resistance will not be obtained. On the other hand, the desired corrosion resistance and marring resistance will not be obtained if 95% is exceeded.

Silica ($SiO_2$) is added to the water-based metal surface treatment composition of the present invention in an amount of 3 to 40% (with respect to the total solid weight percentage) in order to improve corrosion resistance. A range of 10 to 30% is even better. The improvement in corrosion resistance will be slight if the weight percentage of silica solids with respect to the total solid weight percentage is less than 3%, but if 40% is exceeded the binder effect of the resin will be minimal and corrosion resistance will decrease. 3 to 30 nm is a suitable particle size of the silica. The targeted corrosion resistance and paint adhesion cannot be obtained if the average particle size is less than 3 nm or greater than 30 nm. There are no particular restrictions on the type of silica in the present invention, but there are liquid phase colloidal silica and vapor phase silica.

Lubricating performance is generally improved by the addition of a lubricating additive to a metal surface treatment composition, but problems remain unsolved with the lubricants such as lead and molybdenum disulfide that have been used in the past, including environmental protection and the elimination of the degreasing step after forming in an effort to shorten the process. Accordingly, with the present invention, it is preferable for a lubricating component to be contained in an amount of 2 to 30 wt % with respect to the total solid weight percentage (e) of the water-based paint composition. A range of 10 to 25 wt % is even better. It is also preferable if the saponification value of the above-mentioned polyolefin wax is 30 or less, or zero, and the structure is branched. The effect of improving workability will be minimal if the polyolefin wax is added in an amount of less than 2 wt %, but if the amount is over 30 wt %, the wax will scatter onto the press apparatus and the surrounding area during forming, which is undesirable from the standpoint of the working environment, and corrosion resistance is also decreased. If the wax saponification value is over 30, the polarity will be high and the wax will be very miscible in the resin, making it difficult to form the film on the surface of the resin, so this is unsuitable when a high level of working performance is required. More preferable is a wax with a saponification value of zero, which has no ester bonds and very little miscibility with the resin. The average particle size of the wax is preferably 0.1 to 7.0 μm. Workability will be unsatisfactory if the average particle size is less than 0.1 μm, but exceeding 7.0 μm is undesirable because the distribution of the solidified wax will be uneven. It is preferable for the wax to have a melting point of 110 to 160° C. Because the temperature of the sheet surfaces can exceed 100° C. during press forming, adequate lubricity cannot be obtained if the melting point of the wax is lower than 110° C., but conversely, the lubricity had by the wax will not be manifested during forming if the melting point of the wax is over 160° C. As to the shape of the wax particles, spherical is best in order to obtain good workability.

A surfactant (called a wettability improver) or a thickener can also be added to the surface treatment composition of the present invention in order to obtain a uniform film on the coated surface, a conductive substance can be added to improve weldability, or a coloring pigment or the like can be added to improve the appearance of the product.

Examples of the material that is coated with the water-based metal surface treatment composition of the present invention include cold rolled steel sheets, galvanized steel sheets, and stainless steel sheets. A primer treatment is preferable in order to improve corrosion resistance. Suitable primer treatments include known chromate treatments and phosphate treatments. It is favorable for this primer film to be coated with the above-mentioned surface treatment composition such that the dry film weight is 0.3 to 5.0 g/m$^2$, which affords good performance such as marring resistance, corrosion resistance, and solvent resistance. There are no particular restrictions on the coating method in the present invention, but examples include roll coating, dipping, and electrostatic coating.

BEST MODE FOR CARRYING OUT THE INVENTION

Examples of the present invention will now be given along with comparative examples in order to describe the present invention is specific terms.

1. Production of Test Pieces
(1-1) Test Materials
The commercially available materials listed below were used as the test materials.

Double-sided electrogalvanized steel sheet (EG): sheet thickness=0.8 mm, basis weight=20/20 (g/m$^2$)

Cold rolled steel sheet (SPCC): SPCC material, sheet thickness=0.8 mm (1-2) Degreasing The test materials were degreased with Fine Cleaner 4336 (trademark of Nihon Parkerizing), a silicate-based alkali degreaser (concentration: 20 g/L; temperature: 60° C.; sprayed for 2 minutes).

(1-3-1) Chromate Primer Treatment

To form a chromate film on the EG material, the material was sprayed (bath temperature: 50° C.; duration: 10 seconds) with Zinchrome 3367 (trademark of Nihon Parkerizing), rinsed with water, and then dried for 10 seconds at an atmosphere temperature of 220° C. (maximum steel sheet temperature: 100° C.). The chromium coating amount was 50 mg/M$^2$.

(1-3-2) Zinc Phosphate Primer Treatment

To form a zinc phosphate film, the material was dipped (bath temperature: 45° C.; duration: 2 minutes) in Palbond L3020 (trademark of Nihon Parkerizing), rinsed with water, and then blow dried. The film weight was 2.0 g/m$^2$.

(1-4) Application of Water-based Metal Surface Treatment Composition

The water-based metal surface treatment composition shown in Table 2 was applied with a bar coater and dried for 15 seconds at an atmosphere temperature of 320° C. (maximum steel sheet temperature: 160° C.). (Target coating weight: 1.0 g/m$^2$)

2. Coated Sheet Performance Test
(2-1) Corrosion Resistance

A saltwater spray test was conducted for 400 hours according to JIS Z 2731, and the test pieces were checked for white rust.

Evaluation Criteria

+: less than 3% of the total surface area was rusted o: at least 3% but less than 10% of the total surface area was rusted Δ: at least 10% but less than 30% of the total surface area was rusted x: at least 30% of the total surface area was rusted (2-2) Corrosion Resistance after Working A blank sheet with a diameter of 100 mm was used to conduct a high-speed cylinder deep-drawing test, in which the conditions comprised a punch diameter of 50 mm, a pressure plate force of 1 ton, and a deep drawing rate of 30 meters per minute. The draw ratio here was 2.00.

Evaluation Criteria

+: less than 3% of the total surface area was rusted o: at least 3% but less than 10% of the total surface area was rusted Δ: at least 10% of the total surface area was rusted, with no performance loss x: at least 10% of the total surface area was rusted, with performance loss (2-3) High-speed Marring Resistance A blank sheet with a diameter of 115 mm was used to conduct a high-speed cylinder deep-drawing test, in which the conditions comprised a punch diameter of 50 mm, a die diameter of 52 mm, a pressure plate force of 1 ton, and a deep drawing rate of 30 meters per minute. The draw ratio here was 2.30.

Evaluation Criteria

+: Press released up to a draw ratio of 2.40, good appearance

○: Press released up to a draw ratio of 2.40, poor appearance

Δ: Press released up to a draw ratio of 2.35 x: Press released up to a draw ratio of 2.30

(2-4) Low-speed Marring Resistance

A test sheet was cut to a width of 30 mm, and a draw bead test was conducted at a tip radius of 0.5 mm, a forming height of 4 mm, a contact bonding load of 0.5 ton, and a draw rate of 240 mm/min. The appearance of the sheet was then evaluated.

Evaluation Criteria

+: No film marring

○: Marred portion of film was less than 5% of the overall sliding portion

Δ: Marred portion of film was at least 5% but less than 20% of the overall sliding portion x: Marred portion of film was at least 20% of the overall sliding portion (2-5) Paint Adhesion A melamine alkyd-based paint (Aramic #1000, trademark of Kansai Paint) was applied such that the film thickness after bake drying would be 25 μm. The coating was bake dried for 20 minutes at 125° C., and 24 hours later the test piece was soaked in boiling water for 2 hours, and was evaluated after another 24 hours. Paint adhesion was evaluated by conducting tests according to JIS K 5400 (design, cross-hatch, Eriksen, impact), and making an evaluation from the overall evaluation of these tests.

Evaluation Criteria

+: Surface area of coating film that peeled: 0%

○: Surface area of coating film that peeled: 0 to 1%

Δ: Surface area of coating film that peeled: 1 to 10% x: Surface area of coating film that peeled: over 10%

3. Test Results

Table 1 lists the components of the water-based metal surface treatment compositions, and Table 2 lists the levels of the water-based metal surface treatment compositions. Examples and comparative examples are illustrated in these tables.

In Examples 1 to 10 in Table 3, a galvanized steel sheet was subjected to a chromate treatment, and a cold rolled steel sheet to a phosphate treatment, after which each was coated with a water-based metal surface treatment composition of the present invention (Nos. 1 to 9 in Table 2), and the coating was then dried to form a film. Corrosion resistance, the corrosion resistance of the worked areas, marring resistance, and paint adhesion were all good. Meanwhile, the overall corrosion resistance, corrosion resistance of the worked areas, marring resistance, and paint adhesion were all inferior in Comparative Examples 11 to 22, in which water-based metal surface treatment composition Nos. 10 to 20 in Table 2 (different from those of the present invention) were used.

INDUSTRIAL APPLICABILITY

A film with excellent paint adhesion and marring resistance during intense working is obtained by coating the surface of galvanized sheet steel or the like with the water-based metal surface treatment composition of the present invention.

TABLE 1

List of components of water-based metal surface treatment composition 1-1) Water-based urethane resin

| | | A | B | C |
|---|---|---|---|---|
| Average molecular weight | | 30000 | 50000 | 10000 |
| Nitrogen content*1 | | 7.6% | 6.3% | 5.2% |
| Urea bonds/nitrogen*2 | | 50/100 | 70/100 | 20/100 |
| Polyol | Ether-based | bisphenol A | bisphenol F + 1,6-hexanediol | PTMG |
| | Ester-based | 1,6-hexanediol + isophthalic acid | 1,6-hexanediol + adipic acid | bisphenol A + succinic acid |
| Acid value calculated as solids | | 16 | 20 | 40 |
| Solids concentration | | 35% | 30% | 32% |
| Claims*3 | | ○ | ○ | ○ |

| | | D | E | F |
|---|---|---|---|---|
| Average molecular weight | | 2500 | 10000 | 20000 |
| Nitrogen content*1 | | 4.5% | 15.0% | 1.0% |
| Urea bonds/nitrogen*2 | | 40/100 | 80/100 | 55/100 |
| Polyol | Ether-based | bisphenol A | bisphenol A + diethylene glycol | bisphenol A |
| | Ester-based | diethylene glycol + adipic acid | none | PTMG + adipic acid |
| Acid value calculated as solids | | 40 | 30 | 22 |
| Solids concentration | | 32% | 37% | 35% |
| Claims*3 | | x (molecular weight) | x (nitrogen content) | x (nitrogen content) |

| | | G | H | I |
|---|---|---|---|---|
| Average molecular weight | | 10000 | 20000 | 50000 |
| Nitrogen content*1 | | 4.0% | 10.0% | 8.2% |
| Urea bonds/nitrogen*2 | | 4/100 | 95/100 | 55/100 |
| Polyol | Ether-based | bisphenol A | bisphenol A | PTMG*4 |
| | Ester-based | 1,6-hexanediol + isophthalic acid | 1,4-butanediol + adipic acid | diethylene glycol + adipic acid |
| Acid value calculated as solids | | 28 | 14 | 20 |
| Solids concentration | | 37% | 35% | 30% |
| Claims*3 | | x (urea bond ratio) | x (urea bond ratio) | x (no bisphenol) |

| | | J*5 | K | L (A/E = 1/1) |
|---|---|---|---|---|
| Average molecular weight | | 40000 | 10000 | 20000 |
| Nitrogen content*1 | | 6.2% | 9.5% | 11.8% |
| Urea bonds/nitrogen*2 | | 30/100 | 40/100 | 27/100 |
| Polyol | Ether-based | bisphenol A + trimethylolpropane | bisphenol A | bisphenol A |
| | Ester-based | diethylene glycol + adipic acid | 1,6-hexanediol + hydrogenated bisphenol A | 1,6-hexanedial + isophthalic acid |

TABLE 1-continued

List of components of water-based metal surface treatment composition

| Acid value calculated as solids | 0 | 70 | 22 |
|---|---|---|---|
| Solids concentration | 32% | 38% | 36% |
| Claims*3 | x (acid value) | x (acid value) | ○ |

1-2) Hardener

|  | A | B | c |
|---|---|---|---|
| Type of functional group | epoxy group | isocyanate group | oxazoline ring |
| Functional group equivalents*6 | 200 | 200 | 1100 |
| Solids concentration | 50% | 20% | 40% |
| Claims*7 | ○ | ○ | Δ |

1-3) Silica

|  | A | B | C |
|---|---|---|---|
| Type | liquid phase colloid | vapor phase silica | liquid phase colloid |
| Average particle size | 20 nm | 12 nm | 40 nm |
| Solids concentration in a dispersion | 20% | 20% | 20% |

1-4) Polyolefin wax

|  | 1 | 2 | 3 |
|---|---|---|---|
| Type | low density polyethylene | high density polyethylene | low density polyethylene |
| Saponification value | 0 | 10 | 40 |
| Average particle size | 2.0 μm | 10.0 μm | 1.0 μm |
| Melting point | 115° C. | 132° C. | 112° C. |
| Solids concentration | 40% | 40% | 35% |
| Claims*8 | ○ | Δ (particle size) | Δ (saponification value) |

*1 Proportion of nitrogen atoms participating in the isocyanate reaction during resin synthesis with respect to the water-based urethane resin
*2 (Nitrogen atoms pertaining to urea bonds in the water-based urethane resin)/(nitrogen atoms in the water-based urethane resin)
*3 A water-based urethane resin that can be used in the present invention is indicated by a "○," while a water-based urethane resin that is unsuited to the present invention is indicated by an "x." The reason is given in parentheses.
*4 Polytetramethylene glycol with a molecular weight of 1000
*5 Could not be dispersed in water.
*6 Functional group equivalents = solids concentration/effective number of functional groups
*7 A hardener that satisfies Claim 3 is indicated by a "○," while a hardener that satisfies only Claim 1 is indicated by a "Δ." The above silicas satisfy all of the claims.
*8 A polyolefin wax that satisfies Claims 5 and 6 is indicated by a "○," while a polyolefin wax that satisfies Claim 1 but not Claim 5 or 6 is indicated by a "Δ." The reason is given in parentheses.

TABLE 2

Levels of water-based metal surface treatment compositions
2-1) Components used in examples Make-up of solids in water-based metal surface treatment composition*8

| | Base resin | | | | | |
|---|---|---|---|---|---|---|
| | Urethane (a) | Crosslinking agent (b) | Blend ratio of crosslinking agents (a) + (b) (e) | Functional groups*9 | Silica (c) | Polyolefin wax (d) |
| Example | | | | | | |
| 1 | A (57) | a (3) | 60 | 0.93 | A (25) | 1 (15) |
| 2 | B (56) | a (4) | 60 | 1.00 | A (25) | 1 (15) |
| 3 | C (62) | a (8) | 70 | 0.91 | A (15) | 1 (15) |
| 4 | A (68) | b (2) | 70 | 0.53 | A (15) | 1 (15) |
| 5 | A (52) | c (8) | 60 | 0.56 | A (25) | 1 (15) |
| 6 | A (64) | a (1) | 65 | 0.28 | B (20) | 1 (15) |
| 7 | C (44) | c (26) | 70 | 0.84 | C (15) | 1 (15) |
| 8 | A (62) | a (3) | 65 | 0.85 | A (20) | 2 (15) |
| 9 | A (58) | a (2) | 60 | 0.62 | A (25) | 3 (15) |
| 10 | L (58) | a (2) | 60 | 0.46 | A (25) | 1 (15) |
| Comparative Example | | | | | | |
| 11 | D (53) | a (7) | 60 | 0.93 | A (25) | 1 (15) |
| 12 | E (56) | b (4) | 60 | 0.69 | A (25) | 1 (15) |
| 13 | F (68) | a (2) | 70 | 0.39 | A (15) | 1 (15) |
| 14 | G (67) | b (3) | 70 | 0.47 | A (15) | 1 (15) |
| 15 | H (63) | a (2) | 65 | 0.65 | B (20) | 1 (15) |
| 16 | I (68) | b (2) | 70 | 0.60 | A (15) | 1 (15) |
| 17 | K (52) | a (13) | 65 | 1.00 | A (20) | 1 (15) |
| 18 | A (60) | — | 60 | 0 | C (25) | 1 (15) |
| 19 | B (58) | a (7) | 65 | 1.62 | A (20) | 2 (15) |

TABLE 2-continued

Levels of water-based metal surface treatment compositions 2-1) Components used in examples Make-up of solids in water-based metal surface treatment composition[*8]

|  | Base resin | | | | | Polyolefin |
|---|---|---|---|---|---|---|
|  |  |  | Blend ratio of crosslinking agents | | | |
|  | Urethane (a) | Crosslinking agent (b) | (a) + (b) (e) | Functional groups[*9] | Silica (c) | wax (d) |
| 20 | A (79) | a (4) | 83 | 0.89 | A (2) | 3 (15) |
| 21 | A (48) | a (2) | 50 | 0.74 | A (45) | 1 (5) |
| 22 | A (75) | a (4) | 79 | 0.94 | B (20) | 1 (1) |
| 23 | A (48) | a (2) | 50 | 0.74 | C (15) | 1 (35) |

[*8]The numbers in parentheses are the weight percentage of solids versus the total solids (e)

[*9]Proportion of functional groups in the crosslinking agent versus the carboxyl groups in the water-based urethane resin

TABLE 3

Performance overview

| | | | | | | Primer | | | | |
|---|---|---|---|---|---|---|---|---|---|---|
| | Material | Water-based composition Type | Type | Coating weight (g/m²) | Coating weight (g/m²) | Corrosion resistance | Corrosion resistance of worked areas | High-speed marring resistance | Low-speed marring resistance | Paint adhesion |
| Present Invention | | | | | | | | | | |
| 1 | EG | 1 | chromate | 0.05 | 1.0 | + | + | + | + | + |
| 2 | ↑ | 2 | ↑ | ↑ | ↑ | + | + | + | + | + |
| 3 | ↑ | 3 | ↑ | ↑ | ↑ | + | + | ○ | + | + |
| 4 | ↑ | 4 | ↑ | ↑ | ↑ | + | + | + | + | + |
| 5 | ↑ | 5 | ↑ | ↑ | ↑ | + | + | + | + | + |
| 6 | ↑ | 6 | ↑ | ↑ | ↑ | + | + | + | + | + |
| 7 | ↑ | 7 | ↑ | ↑ | ↑ | + | ○ | ○ | + | ○ |
| 8 | ↑ | 8 | ↑ | ↑ | ↑ | + | + | + | + | + |
| 9 | ↑ | 9 | ↑ | ↑ | ↑ | + | + | + | + | ○ |
| 10 | ↑ | 10 | ↑ | ↑ | ↑ | + | + | ○ | + | ○ |
| 11 | ↑ | 1 | ↑ | ↑ | 0.5 | ○ | ○ | ○ | ○ | + |
| 12 | ↑ | ↑ | ↑ | ↑ | 3.0 | + | + | + | + | + |
| 13 | SPCC | 1 | phosphate | 2.00 | 1.0 | + | + | + | + | + |
| Comparative Example | | | | | | | | | | |
| 14 | EG | 11 | chromate | 0.05 | ↑ | Δ | X | X | X | X |
| 15 | ↑ | 12 | ↑ | ↑ | ↑ | Δ | X | X | Δ | X |
| 16 | ↑ | 13 | ↑ | ↑ | ↑ | Δ | X | X | ○ | X |
| 17 | ↑ | 14 | ↑ | ↑ | ↑ | Δ | Δ | Δ | Δ | Δ |
| 18 | ↑ | 15 | ↑ | ↑ | ↑ | X | X | X | X | X |
| 19 | ↑ | 16 | ↑ | ↑ | ↑ | Δ | X | X | Δ | Δ |
| 20 | ↑ | 17 | ↑ | ↑ | ↑ | Δ | X | X | X | X |
| 21 | ↑ | 18 | ↑ | ↑ | ↑ | X | X | X | X | X |
| 22 | ↑ | 19 | ↑ | ↑ | ↑ | Δ | Δ | X | X | Δ |
| 23 | ↑ | 20 | ↑ | ↑ | ↑ | X | X | X | X | Δ |
| 24 | ↑ | 21 | ↑ | ↑ | ↑ | Δ | X | X | Δ | Δ |
| 25 | ↑ | 22 | ↑ | ↑ | ↑ | Δ | X | X | X | Δ |
| 26 | ↑ | 23 | ↑ | ↑ | ↑ | Δ | Δ | Δ | ○ | Δ |
| 27 | SPCC | 11 | phosphate | 2.00 | ↑ | Δ | Δ | Δ | Δ | X |

What is claimed is:

1. A water-based metal surface treatment composition for forming a lubricating film with excellent marring resistance comprising:
   (a) a water-based urethane resin having:
      an average molecular weight of at least 3000,
      a resin skeleton which comprises a bisphenol skeleton, at least one carboxyl group, and urea bonds, and
      a nitrogen content between 2 and 13 wt %,
   wherein synthesis of said water-based urethane resin comprises:
      an isocyanate reaction with one or more polyols to form one or more resin skeletons, wherein at least a portion of the one or more polyols has a bisphenol skeleton,
      introduction of at least one carboxyl group to the one or more resin skeletons, and
      introduction of urea bonds to the one or more resin skeletons;
   wherein the nitrogen content of water-based urethane is based on nitrogen atoms that participated in the isocyanate reaction; and
   wherein the proportion of nitrogen atoms present in urea bonds to the nitrogen atoms that participated in the isocyanate reaction during the synthesis of said water-based urethane resin, is between 10/100 and 90/100;
   (b) a hardener;
   (c) silica; and
   (d) a polyolefin wax,
   wherein the combined amount of components (a) and (b), as solids with respect to the total solid weight (e), is 50 to 95 wt %, the equivalent ratio of functional groups in component (b) with respect to the equivalents of carboxyl groups contained in the resin skeleton of component (a) is 0.10 to 1.00, the solid weight of component (c) with respect to (e) is 3 to 40 wt %, and the solid weight of component (d) with respect to (e) is 2 to 30 wt %.

2. A water-based metal surface treatment composition as defined in claim 1, wherein the nitrogen content of the water-based urethane resin is 5 to 10 wt %.

3. A water-based metal surface treatment composition as defined in claim 1, wherein the hardener comprises at least one type of functional group selected from the group consisting of epoxy groups and isocyanate groups.

4. A water-based metal surface treatment composition as defined in claim 1, wherein the amount of carboxyl groups in the water-based urethane resin is 10 to 50 calculated as the acid value for the solids of said resin.

5. A water-based metal surface treatment composition as defined in claim 1, wherein the saponification value of the polyolefin wax is zero to 30, and the structure of the polyolefin wax is branched.

6. A water-based metal surface treatment composition as defined in claim 1, wherein the polyolefin wax has an average particle size of 0.1 to 7.0 $\mu$m.

7. A water-based metal surface treatment composition as defined in claim 1, wherein the proportion of nitrogen in urea bonds to the nitrogen that participated in the isocyanate reaction is between 40/100 to 80/100.

8. A water-based metal surface treatment composition as defined in claim 1, wherein the equivalent ratio of functional groups in component (b) with respect to the equivalents of carboxyl groups contained in the skeleton of component (a) is 0.30 to 1.00.

9. A water-based metal surface treatment composition as defined in claim 1, wherein the combined amount of components (a) and (b), as solids with respect to the total solid weight (e), is 55 to 75%.

10. A water-based metal surface treatment composition as defined in claim 1 wherein the solid weight of component (c) with respect to (e) is 10 to 30 wt %.

11. A water-based metal surface treatment composition as defined in claim 1, wherein said silica has a particle size of 3 to 30 nm.

12. A water-based metal surface treatment composition as defined in claim 1, wherein said polyolefin wax has a melting point of 110 to 160° C.

13. A method of forming a lubricating film with excellent marring resistance on a metal surface, said method comprising:
   (a) forming a coating on said metal surface of the water-based metal surface treatment composition of claim 1; and
   (b) drying said coating.

14. The method of claim 13 wherein said metal surface is a material selected from the group consisting of cold rolled steel sheets, galvanized steel sheets, and stainless steel sheets.

15. The method of claim 13 wherein said coating after drying has a weight of from 0.3 to 5.0 g/m$^2$.

16. The method of claim 13 wherein said metal surface is degreased prior to step (a).

17. The method of claim 13 wherein a primer film is formed on said metal surface prior to step (a).

18. A lubricating film obtained by drying a coating of the water-based metal surface treatment composition of claim 1.

19. A water-based surface treatment composition for forming a lubricating film with excellent marring resistance, comprising:
   (a) a water-based urethane resin having:
      an average molecular weight of at least 3000,
      a resin skeleton which comprises a bisphenol skeleton, at least one carboxyl group, and urea bonds, and
      a nitrogen content between 5 and 10 wt %,
   wherein synthesis of said water-based urethane resin comprises:
      an isocyanate reaction with one or more polyols to form one or more resin skeletons, wherein at least a portion of the one or more polyols has a bisphenol skeleton,
      introduction of at least one carboxyl group to the one or more resin skeletons, and
      introduction of urea bonds to the one or more resin skeletons;
   wherein the nitrogen content of water-based urethane is based on nitrogen atoms that participated in the isocyanate reaction; and
   wherein the proportion of nitrogen atoms present in urea bonds to the nitrogen atoms participating in the isocyanate reaction during the synthesis of said water-based urethane resin, is between 40/100 and 80/100;
   (b) a hardener comprising at least one type of functional group selected from the group consisting of epoxy groups and isocyanate groups;
   (c) silica having a particle size of 3 to 30 nm; and (d) a polyolefin wax having a branched structure, an average particle size of 0.1 to 7.0 μm and a saponification value of zero to 30;

wherein the combined amount of components (a) and (b), as solids with respect to the total solid weight (e), is 55 to 75 wt %, the equivalent ratio of functional groups in component (b) with respect to the equivalents of carboxyl groups contained in the resin skeleton of component (a) is 0.30 to 1.00, the solid weight of component (c) with respect to (e) is 10 to 30 wt %, and the solid weight of component (d) with respect to (e) is 10 to 25 wt %.

20. A lubricating film obtained by drying a coating of the water-based surface treatment composition of claim 19.

21. A method of forming a lubricating film with excellent marring resistance on a metal surface, said method comprising:

(a) forming a coating on said metal surface of the water-based metal surface treatment composition of claim 19; and (b) drying said coating.

* * * * *